United States Patent [19]

Netherwood et al.

[11] Patent Number: 4,476,142
[45] Date of Patent: Oct. 9, 1984

[54] PEPPERMINT OIL FLAVORED COMPOSITIONS

[75] Inventors: Shelley Netherwood, Brea, Calif.; Bernie Blackwell, Laurelton; Dominick Piccolo, Brooklyn, both of N.Y.

[73] Assignee: Warner-Lambert Company, Morris Plains, N.J.

[21] Appl. No.: 450,811

[22] Filed: Dec. 20, 1982

[51] Int. Cl.$^3$ .......................... A23G 3/00; A23G 3/30; A23L 1/221
[52] U.S. Cl. ....................................... 426/3; 426/533; 426/651; 426/660
[58] Field of Search ....................... 426/533, 651, 3–6, 426/660; 260/236.6

[56] References Cited

U.S. PATENT DOCUMENTS 2,435,744 2/1948 Hartman ............................ 426/651
3,083,105 3/1963 Todd ................................ 260/236.6
4,259,355 3/1981 Marmo ............................... 426/651

FOREIGN PATENT DOCUMENTS 33250 5/1973 Japan ................................ 426/651

OTHER PUBLICATIONS

Arctander, Perfume and Flavor Chemicals II, Pub. Arctander 1969, Montclair, N.J., p. 1838.

Primary Examiner—Jeanette Hunter
Attorney, Agent, or Firm—Gary M. Nath; Daniel A. Scola, Jr.

[57] ABSTRACT

A peppermint oil flavored chewing gum or confectionery composition, having incorporated therein between about 0.01% and about 5.0% by weight of the final composition of a stabilized peppermint oil having a reduced menthofuran content of from about 0.8% to about 2.0% by weight based on the weight of peppermint oil.

6 Claims, No Drawings

PEPPERMINT OIL FLAVORED COMPOSITIONS

The present invention relates to a peppermint oil flavoring composition and more particularly to a peppermint oil flavored chewing gum and confectionery composition.

Peppermint oil is a well know flavoring agent derived from the leaves and flowering tops of the plant (Mentha poperita L). The plants habitate is quite diverse and has been found in parts of Asia, Europe, and North America.

The peppermint oil constituents will vary depending on the source of the plant even though several main constituents are usually present. In general, peppermint oil contains varying amounts of alpha-pinene, beta-pinene, limonene, 1,8-cineole, menthone, menthofuran, isomenthol, menthyl acetate, neomenthol and menthol as well as various amounts of other constituents.

A disadvantage associated with the use of peppermint oil in the past has been its degradation during storage resulting in change in odor and flavor properties. Several studies have undertaken to identify the aging characteristics of peppermint oil.

One study is described by R. H. Reitsema, et al. in *Oxidation of Peppermint Oil*, Industrial and Engineering Chemistry, Vol 44, page 176, January 1952, wherein three reactions are described as contributing to the aging process. The first reaction is the isomerization of terpenes which is described as having only minor importance. The second reaction involves the polymerization of the oil constituents which is noted as increasing the oils molecular weight and the viscosity of the resulting product. And thirdly, the most important reaction is identified as the oxidation of the peppermint oil which affects aging of the oil from a flavor standpoint. Specific components involved in the oxidation aging process include the pinenes, limonene and menthofuran.

Various attempts have been made to inhibit the oxidation process to prevent the formation of oxidative by-products commonly referred to as "off-note" material. One conventional technique involves the use of antioxidants in the peppermint oil in an effort to inhibit the reaction from occurring. The use of such antioxidants, however, have not been successful since they are either not effective in suppressing the oxidation reaction over prolonged storage conditions or they have resulted in the formation of "off-note" peppermint oil detracting from the flavoring agent properties. These processes at best have merely attempted to mask the oxidation process by-products without removing the oxidative constituents from the oil themselves.

Another attempt to overcome the oxidation phenomenon is disclosed by Guenther in *The Essential Oils*, Vol III (1949), page 619. This reference discloses use of a fractional distillation technique to separate the peppermint oil flavor constituents from menthofuran. This technique was unsuccessful, however, since the menthofuran was codistilled with menthone, a major flavoring component of peppermint oil, rendering the recovered product unsuitable for use as a flavoring agent.

Applicants have unexpectedly discovered a new process which selectively removes one of the primary "off-note" oxidative by-product contributors, namely menthofuran, which process is described in copending application Ser. No. 450,870 filed Dec. 20, 1982 entitled "Process for Stabilizing Peppermint Oil" filed simultaneously herewith and identified as PD-2992. The process described in this copending application for stabilizing the peppermint oil is incorporated herein by reference.

In accordance with the present invention there is provided a novel peppermint oil flavored chewing gum and confectionery which employs a base support media having incorporated therein between about 0.01% and about 5.0% by weight of the final composition of a stabilized peppermint oil containing a reduced menthofuran content of from 0.8 to about 2.0% by weight based on the weight of the peppermint oil.

Another aspect of the invention involves a method for preparing the peppermint oil flavored chewing gum and confectionery compositions using a peppermint oil containing a deliberately reduced menthofuran content.

In accordance with the present invention, a stabilized peppermint oil as herein described is incorporated into a conventional chewing gum formulation or confectionery formulation. Both formulations may be sugar containing and/or sugar free materials wherein the stabilized peppermint oil is incorporated in a base support media for the respective formulation. The term "base support media" as used herein refers to the basic components which make up the particular chewing gum or confectionery formulation. In the case of chewing gum, the base support material will comprise the chewing gum base whereas in the case of a confectionery, the base support material will comprise the sweetening or syrup component.

With regard to chewing gum formulations in particular, the gum base used in this invention may be any water-insoluble gum base well known in the art. Illustrative examples of suitable polymers in gum bases include without limitation substances of vegetable origin such as chicle, jelutong, guttakay and crown gum; synthetic elastimers such as butadiene-styrene copolymer, isobutylene isoprene copolymer, polyethylene, polyisobutylene and polyvinylacetate, mixtures thereof, and the like.

The amount of gum base employed will vary greatly depending on various factors such as the type of base used, consistency desired and other components used to make the final product. In general, amounts from about 5% to 45% by weight of the final gum base composition are acceptable with preferred amounts of about 15% to about 25% by weight being useable.

Plasticizers or softeners such as lanolin, stearic acid, sodium stearate, potassium stearate, glyceryl triacetate, glycerin and the like may also be incorporated into the gum base to obtain desirable texture and consistency properties. Such materials are generally employed in amounts up to 30% by weight and preferably from 3 to 7% by weight of the final gum base composition.

The chewing gum composition generally contains a sweetening agent. Sweetening agents may be selected from a wide range of materials such as water-soluble sweetening agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e. sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweetener selected for a particular chewing gum. This amount will normally be about 0.01% to about 90% by weight when using an easily extractable sweetener. The water-soluble sweeteners described in category A are preferably used in amounts of about 25% to about 75% by weight, and most preferably about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are necessary to achieve a desired level of sweetness independent from the flavor level achieved from the flavor oil.

The chewing gum of this invention may likewise contain additional conventional additives, including fillers such as calcium carbonate and talc; emulsifiers such as glyceryl monostearate and lecithin; coloring agents such as titanium dioxide and other conventional chewing gum additives known to one skilled in the chewing gum art.

The amount of stabilized peppermint oil employed is also a matter of preference subject to such factors as strength desired and gum base employed. In general, amounts between about 0.01% and about 5% by weight of the final chewing gum composition have been found quite acceptable with amounts between about 0.1% and about 2% being preferred and about 0.8% to about 1.2% being most preferred.

The stabilized peppermint oil may be incorporated into an otherwise conventional chewing gum formulation using standard techniques and equipment known to those skilled in the art. In a typical embodiment the chewing gum base is blended with a plasticizer together with other additives such as fillers and coloring agents under heat to plasticize the blend as well as to modulate the hardness, viscoelasticity and formability of the base. The heating temperature may vary widely but is for practical purposes preferably around 70° C. to 120° C. The chewing gum base is then blended with the flavoring composition which may have been previously blended with other ingredients. Once blending is achieved the chewing gum formulation is removed and formed into any suitable shape.

The chewing gums of the invention may be in any form known in the art, such as stick gum, slab gum, chunk gum, shredded gum, hard coated gum, as well as center-filled gum.

The preparation of confectionery formulations is historically well known and has changed little through the years. In this regard, confectionery items have been classified as either the "hard" type or the "soft" type.

The preparation of soft confections, such as nougat, involves conventional methods, such as the combination of two primary components, namely (1) a high boiling syrup such as corn syrup or the like and (2) a relatively light textured frappé, generally prepared from gelatin, egg albumen, milk proteins such as casein and vegetable proteins such as soy protein, and the like. The frappe is generally relatively light, and may, for example, range in density from about 0.5 to about 0.7.

The high boiled syrup of the soft confectionery is relatively viscous and possesses a higher density, and frequently contains a substantial amount of sugar. Conventionally, the final nougat composition is prepared by the addition of the high boiled syrup to the frappé under agitation, to form the basic nougat mixture. Further ingredients such as the stabilized peppermint oil, flavoring, additional sugar colorants, preservatives, medicaments, mixtures thereof and the like may be added thereafter also under agitation. A general discussion of the composition and preparation of nougat confections may be found in B. W. Minifie, *CHOCOLATE, COCOA AND CONFECTIONERY*: Science and Technology, 2nd Edition, AVI Publishing Co., Inc., Westport, Conn. (1980), at pages 424–425.

The procedure for preparing the "soft" confectionery involves known procedures. In general, the frappé component is prepared first and thereafter the syrup component is slowly added under agitation at a temperature of at least 65° C. and preferably at least 100° C. The components are continued to be mixed to from a uniform mixture, after which the mixture is cooled to a temperature below 80° C. at which point the stabilized peppermint oil may be added. The mixture is further mixed for an additional period at which point it is ready for removal and formed into suitable confectionery shapes.

Similar to the soft confectionery, hard confectionery may be utilized in this invention which likewise may be processed and formulated by conventional means. In general, a hard confectionery has a base composed of a mixture of cane or beet sugar and glucose syrup, low moisture levels from 0.5 to 1.5% and is present in the final confectionery in amounts of between about 5% and about 99% by weight of the final composition. Such confectionery may be routinely prepared by conventional methods, such as those involving fire cookers, vacuum cookers and scraped-surface cookers also referred to as high speed atmospheric cookers.

Fire cookers involve the traditional method of making candy base. In this method the desired quantity of sugar is dissolved in water by heating in a kettle until the sugar dissolves. Corn syrup or an invert sugar is then added and cooking continued until a final temperature of 145 to 156° C. is achieved. The batch is then cooled and worked as a plastic-like mass to incorporate additives.

A high-speed atmospheric cooker uses a heat-exchanger surface which involves spreading a film of candy on a heat exchange surface, the candy is heated to 165 to 170° C. in a few minutes. The candy is then rapidly cooled to 100 to 120° C. and worked as a plasticlike mass enabling incorporation of the additives, such as flavor, color, acidulents and medicaments.

In vacuum cookers, the sugar and corn syrup are boiled to 125° to 132° C. and vacuum applied and additional water is boiled off without extra heating. When cooking is complete, the mass is a semi-solid, having a plastic-like consistency. At this point color flavors and other additives are mixed in the mass by routine mechanical mixing operations.

The optimum mixing required to uniformly mix the flavor, color and other additives during conventional manufacturing of hard confectionery is determined by the time needed to obtain a uniform distribution of the materials. Normally, mixing times of 4 to 10 minutes have been found acceptable.

Once the candy mass has been properly tempered it may be cut into workable portions or formed into desired shapes. A general discussion of the composition and preparation of hard confections may be found in H. A. Lieberman, *Pharmaceutical Dosage Forms: Tablets* Vol 1 (1980), Marcel Dekker, Inc. at pages 339 to 469.

It should be mentioned that the apparatus useful in accordance with the present invention comprises those cooking and mixing apparatus well known in the confectionery manufacturing arts, and therefore the selection of specific apparatus will be apparent to the artisan.

The low menthofuran peppermint oil used in this invention is prepared by the process described in the copending application cited above.

Generally, the low menthofuran peppermint oil of this invention has a menthofuran content after treatment below about 2.0%, and preferably between about 0.8 and about 2.0%, and most preferably between about 0.8% and about 1.4%, all based on the weight of peppermint oil. This amount of menthofuran is achieved by using from about 0.5% to about 15% by weight maleic anhydride by weight of peppermint oil to react with the menthofuran. It should be recognized that the exact amount of maleic anhydride employed will vary depending upon the menthofuran content of the oil and the degree of reduction desired.

In a preferred embodiment for preparing the peppermint oil, a peppermint oil containing menthofuran is admixed with the maleic anhydride and stirred to solubilize the maleic anhydride. The reaction between the menthofuran and the maleic anhydride commences almost instantaneously resulting in an exothermic reaction.

The temperature of the reaction admixture is preferably maintained between about 0° C. and about 80° C. and most preferably between about 25° C. and about 50° C. Temperatures below 0° C. tend to result in the gelation of the oil while temperatures above 80° C. may cause accelerated oxidation and polymerization of the oil constituents. It should be recognized that the reaction is exothermic in nature and use of standard means to maintain the reaction temperature are contemplated to be used and within the skill of the ordinary artisan.

The reaction time is not critical and will vary depending upon the particular reaction temperature employed, faster reaction times occur at higher temperatures, and longer reaction times occur at lower temperatures. For commercial reasons the reaction time may vary from a few seconds up to 12 hours and preferable up to about 5 hours even though longer times (for example up to 4 weeks) at lower temperatures are useable.

Once the reaction is complete the menthofuranmaleic anhydride adduct is separated from the low menthofuran peppermint oil; that is the purified peppermint oil. Since the menthofuran-maleic anhydride adduct is crystalline in peppermint oil at temperatures below 5° C. separation is conveniently performed by lowering the temperature of the admixture to crystallize the menthofuran-maleic anhydride adduct. The resulting peppermint oil is then recovered by conventional solid-liquid separation means such as filtration or decantation and then stored or used directly as a flavoring agent. When used as a flavoring agent, the peppermint oil may be used directly or blended with other flavoring agents, including treated or untreated peppermint oil. It has been found that acceptable peppermint oil flavor is obtained by using not only the stabilized peppermint oil but blends of the stabilized oil with untreated oil in amounts of 1 to 10—10 to 1 molar parts of each oil fraction. The reason why such mixtures demonstrate acceptable flavoring is unknown but is believed to result from some antioxidative effect caused by the stabilized peppermint oil.

In addition to use of the stabilized peppermint oil described, it is also possible to use other secondary flavoring agents within the formulation of this invention. Such additional flavors should be compatible with the peppermint oil and not alter the stability of the peppermint oil.

The secondary flavoring agents useful to prepare the flavoring compositions of this invention may be derived from synthetic flavor oils and/or oils derived from plants, leaves, flowers, fruits, and so forth, and combinations thereof. Representative flavor oils include spearmint oil, cinnamon oil, and oil of wintergreen (methylsalicylate). Also useful are artificial, natural or synthetic fruit flavors such as citrus oils including lemon, orange, grape, lime, and grapefruit, and fruit essences including apple, strawberry, cherry, pineapple and so forth.

The amount of secondary flavoring agent employed is normally a matter of preference subject to such factors as flavor type, base type and strength desired. In general, amounts of about 0.05% to about 3.0% by weight of the final composition are useable with amounts of about 0.3% to about 1.5% being preferred and about 0.8% to about 1.2% being most preferred.

The stabilized peppermint oil may be employed in the chewing gum or confectionery in either liquid form or dried form. When employed in the latter method, suitable drying means such as spray drying the oil or adsorption of the oil within an insoluble porous carrier such as polyethylene may be used. Alternatively, it may be absorbed onto a water soluble material, such as cellulose, starch, sugar and so forth. The actual techniques for preparing such dried forms are well known and do not constitute a part of this invention.

The confectionery useful in this invention include, but not limited to, sugar and sugarless boiled candy, pressed tablets, toffee and nougat.

The following examples are given to illustrate the invention, but are not deemed to be limiting thereof. All percentages given throughout the specification are based upon weight unless otherwise indicated.

The stabilized peppermint oil used in the Examples demonstrating its use according to this invention was prepared by the following procedure.

Five hundred (500) grams of Midwest peppermint oil (A.M. Todd Company, Kalamazoo, Mich.) containing 2.38% menthofuran was mixed with 10% by weight (50 gm.) maleic anhydride in a flask. The mixture was mechanically stirred for a total of 30 minutes at 28° C. during which time a rise in temperature to 50° C. was noted. The solution was then neutralized by washing with 100 grams of 10% $Na_2CO_3$ solution. The lower hydrous layer was separated and discarded which contained $Na_2CO_3$, sodium maleate, and water soluble impurities from the peppermint oil.

The peppermint oil was recovered by distillation under vacuum using a nitrogen purging atmosphere. The distillation unit consisted of a boiling flask, two fractionation columns packed with Berl Saddles, two cold water condensors, a nitrogen embulator, and a graduated vacuum collector. The distillation temperature was maintained between 24° and 86° C. in the pot with a vapor temperature around 57° C.

A product was recovered which contained reduced menthofuran peppermint oil having a yield of 461.0 gms. The menthofuran content in the recovered peppermint oil was 0.85% determined by capillary Gas Chromatography. A residue of 16.10 grams (3.00%) remained in the distillation flask which contained some peppermint oil residue, and the menthofuran-maleic anhydride adduct.

EXAMPLE I

This Example demonstrates use of various peppermint oils in a chewing gum formulation having the following composition:

| Ingredient | % By Weight |
| --- | --- |
| Gum base | 21.0 |
| Corn syrup | 16.0 |
| Sugar | 55.45 |
| Glucose | 6.0 |
| Glycerin | 0.45 |
| Color | 0.10 |
| Lecithin | 0.20 |
| Oil | 0.80 |

The peppermint oil was mixed in the gum formulation in an amount of 0.8% by weight. The gum formulation was rolled and scored to prepare separate pieces for packaging having a dimension of 2⅞ inch (length) × ¾ inch (width) × 0.07 inch (thickness).

The pieces were individually packaged in foil and placed in an oven maintained at a temperature of 37° C. for 6 weeks.

The gum samples were removed and subjected to flavor chew out studies by a 6 member test panel to determine the intensity of oxidative "off-note" product.

The chew out study results are set forth in Table I and show the unexpected stability achieved by using the novel stabilized peppermint oil in a chewing gum formulation.

Independent of the chew out studies the amount of menthofuran present in the flavor oil after the 6 week incubation time was determined by gas chromotography. The results are set forth in Table II which show no oxidation of stabilized peppermint oil whereas high amounts of oxidation is present in the untreated oil.

TABLE I

| Runs | Flavor Description | Menthofuran Content (%) | Results |
| --- | --- | --- | --- |
| Comparative Run A | Standard untreated midwest peppermint oil | 2.38 | Oxidized, unacceptable taste |
| Inventive Run 1 | Stabilized peppermint oil | 0.85 | Minor oxidation, acceptable taste |
| Inventive Run 2 | Blend of 50% Run 1 and 50% Run A | 1.56 | Minor surface oxidation, acceptable taste |
| Inventive Run 3 | Blend of 60% Run 1 and 40% Run A | 1.40 | Minor surface oxidation, acceptable taste |

TABLE II

| Runs | Initial Menthofuran Content (%) | 6 week Menthofuran Content (%) | % Change in Menthofuran Content |
| --- | --- | --- | --- |
| Comparative A | 2.38 | 2.24 | −5.90 |
| Inventive Run 1 | 0.85 | 0.85 | 0 |
| Inventive Run 2 | 1.56 | 1.47 | −3.30 |
| Inventive Run 3 | 1.40 | 1.35 | −3.50 |

EXAMPLE II

This Example demonstrates use of various peppermint oils in the chewing gum formulation of Example I.

The peppermint oil was mixed in the gum formullation in an amount of 0.8% by weight. The gum formulation was rolled, scored, packaged and tested by the procedure described in Example I.

The chew out studies are set forth in Table III and show the unexpected stability achieved by using the novel stabilized peppermint oil in a chewing gum formulation. The 6 test panelists found increased resistance to oxidation in Inventive Example Run 4 but preferred the flavor resulting from the blended oil of Run 5.

TABLE III

| Runs | Flavor Description | Menthofuran Content (%) | Results |
| --- | --- | --- | --- |
| Comparative Run B | Standard untreated midwest peppermint oil | 2.80 | Oxidized, unacceptable taste |
| Inventive Run 4 | Stabilized peppermint oil | 0.85 | Minor oxidation, acceptable taste |
| Inventive Run 5 | Blend of 67% rectified peppermint oil and 33% Run 4 | 1.77 | Minor surface oxidation, acceptable taste |

EXAMPLE III

This Example demonstrates the preparation of a sugarless chewing gum containing the novel stabilized peppermint oil.

A flavored chewing gum was prepared with the following ingredients:

| Ingredient | % By Weight |
| --- | --- |
| Gum base | 26.63 |
| Sorbitol solution | 12.10 |
| Sorbitol sweetener | 54.53 |
| Sodium saccharin | 0.10 |
| Glycerin | 5.04 |
| Flavor containing | 1.6 |
| (a) 45% stabilized peppermint oil | |
| (b) 49% untreated peppermint oil | |
| (c) 6% artificial malt flavor | |

The peppermint oil flavoring agent was mixed in the gum formulation in an amount of 1.6% by weight.

When mixing was complete the chewing gum formulation was rolled, scored and prepared into separate pieces.

A chew out study was conducted with a multiple member test panel to determine the intensity of the product. The panel results indicate that no oxidative "off-notes" were detected and the chewing gum had an acceptable taste.

EXAMPLE IV

This Example demonstrates a "hard" tabletted confectionery containing the novel stabilized peppermint oil.

The flavored confectionery was prepared with the following ingredients:

| Ingredient | % By Weight |
| --- | --- |
| Crystalline sorbitol | 98.00 |
| Calcium phosphate (dibasic) | 0.50 |
| Magnesium stearate | 1.30 |
| Stabilized peppermint oil | 0.20 |

The peppermint oil flavoring agent was mixed with the previously heated and mixed base material at a temperature between 60 and 80° C. Mixing was conducted for several minutes whereupon the mixture was extruded and pressed into flat level edged disc shaped tablets. The tablets had a strong peppermint oil flavor, and firm texture.

The invention being thus described, it will be obvious that the same may be varied in many ways. Such variations are not to be regarded as a departure from the spirit and scope of the invention and all such modifications are intended to be included within the scope of the following claims.

What is claimed is:

1. A flavored chewing gum having a stabilized peppermint oil flavoring agent, which comprises: a chewing gum base and a stabilized peppermint oil incorporated therein in an amount between about 0.01% and about 5.0% by weight of the final composition, wherein the peppermint oil has a previously reduced menthofuran content.

2. The chewing gum of claim 1 wherein the peppermint oil having a reduced menthofuran content is prepared by reacting the peppermint oil with about 0.5% to about 15% by weight maleic anhydride, based on the weight of peppermint oil to selectively form a menthofuran-maleic anhydride adduct without otherwise affecting the flavoring agent properties of the remaining peppermint oil constituents and recovering a peppermint oil having a reduced menthofuran content.

3. A method for forming a flavored chewing gum as defined in claim 1 which comprises admixing a chewing gum base at a temperature from between 70° C. to 120° C. with the stabilized peppermint oil flavoring agent, continuing the mixing until a uniform mixture of gum base and flavoring is obtained and thereafter forming the mixture into suitable chewing gum shapes.

4. A flavored confectionery having a stabilized peppermint oil flavoring agent, which comprises: sweetener in an amount between about 5% and about 99% by weight of the final composition, and a stabilized peppermint oil incorporated therein in an amount between about 0.01% and about 5% by weight of the final composition, wherein the peppermint oil has a previously reduced menthofuran content.

5. The confectionery of claim 4 wherein the peppermint oil having a reduced menthofuran content is prepared by reacting the peppermint oil with about 0.5% to about 15% by weight maleic anhydride, based on the weight of peppermint oil to selectively form a menthofuran-maleic anhydride adduct without otherwise affecting the flavoring agent properties of the remaining peppermint oil constituents and recovering a peppermint oil having a reduced menthofuran content.

6. A method for forming a flavored confectionery of claim 4 which comprises making a confectionery base by heating and mixing together at elevated temperatures the base support material, cooling and kneading the mixture to a temperature below about 120° C., admixing the stabilized peppermint oil into the base support and forming the resulting mixture into a suitable confectionery shape.

* * * * *